(12) United States Patent
Ding et al.

(10) Patent No.: US 10,915,336 B1
(45) Date of Patent: Feb. 9, 2021

(54) OPTIMIZING CONTENT ENGAGEMENT WITH IMPOSED CONTENT CONSTRAINTS

(71) Applicant: Amazon Technologies, Inc., Seattle, WA (US)

(72) Inventors: Weicong Ding, Seattle, WA (US); Dinesh Govindaraj, Sammamish, WA (US); Vishwanathan Swaminathan, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/180,932

(22) Filed: Nov. 5, 2018

(51) Int. Cl.
*G06F 9/451* (2018.01)
*G06N 20/00* (2019.01)
*G06F 16/2457* (2019.01)
*G06F 3/0482* (2013.01)

(52) U.S. Cl.
CPC ........ *G06F 9/451* (2018.02); *G06F 16/24578* (2019.01); *G06N 20/00* (2019.01); *G06F 3/0482* (2013.01)

(58) Field of Classification Search
CPC .. G06F 9/451; G06F 16/24578; G06F 3/0482; G06N 20/00
See application file for complete search history.

(56) References Cited

U.S. PATENT DOCUMENTS

| | | | | |
|---|---|---|---|---|
| 8,473,347 B1* | 6/2013 | Koningstein | .......... | G06Q 30/02 705/14.4 |
| 9,195,753 B1* | 11/2015 | King | .................. | G06F 16/9535 |
| 9,829,947 B1* | 11/2017 | Nagarajan | ............. | G06F 1/3212 |
| 9,998,525 B1* | 6/2018 | Lipus | ...................... | H04L 67/06 |
| 10,049,169 B2* | 8/2018 | Catlin | ................ | G06Q 30/0244 |
| 2009/0248513 A1* | 10/2009 | Aggarwal | ............. | G06Q 30/02 705/14.72 |

(Continued)

OTHER PUBLICATIONS

Abhinandan S Das, et al., Google news personalization: scalable online collaborative filtering. In Proceedings of the 16th international conference on World Wide Web. ACM, 271-280, May 8-12, 2007.

(Continued)

*Primary Examiner* — Mandrita Brahmachari
(74) *Attorney, Agent, or Firm* — Knobbe, Martens, Olson and Bear, LLP

(57) ABSTRACT

Systems and methods are provided for selecting content components to include in portions of a content page under various constraints and according to various effectiveness considerations. Organizing the content components may include considering the expected user engagement with the content components, while simultaneously endeavoring to comply with certain content constraints imposed on the system. The content constraints may be complied with to the greatest extent possible before the expected user engagement with the page is adversely impacted to an unacceptable degree. The content constraints may be imposed across an entire set of content pages, such that only the content pages in the aggregate are expected to comply with a global constraint. This allows for maximizing the expected user engagement while assembling a content page without unduly constraining each content page, where those global constraints may be known to reduce expected user engagement in some instances.

20 Claims, 6 Drawing Sheets

(56) References Cited

U.S. PATENT DOCUMENTS

| | | | | |
|---|---|---|---|---|
| 2011/0010371 | A1* | 1/2011 | Xu | G06Q 10/10 707/749 |
| 2012/0143883 | A1* | 6/2012 | Chen | G06F 16/958 707/751 |
| 2013/0326406 | A1* | 12/2013 | Reiley | G06F 3/048 715/810 |
| 2014/0108153 | A1* | 4/2014 | Matus | G06Q 30/0269 705/14.66 |
| 2014/0280105 | A1* | 9/2014 | Resende | G06Q 30/0266 707/725 |
| 2014/0344861 | A1* | 11/2014 | Berner | H04N 21/4826 725/46 |
| 2015/0039416 | A1* | 2/2015 | Sullivan | G06O 30/0244 705/14.43 |
| 2015/0066597 | A1* | 3/2015 | Givoni | G06Q 10/0637 705/7.36 |
| 2015/0294363 | A1* | 10/2015 | Bhola | G06Q 30/0266 705/14.63 |
| 2016/0342200 | A1* | 11/2016 | Dziuk | G11B 27/038 |
| 2017/0199854 | A1* | 7/2017 | Ruffenach | G06F 17/212 |
| 2017/0206187 | A1* | 7/2017 | Levi | H04L 43/0894 |
| 2018/0225369 | A1* | 8/2018 | Cora | G06N 20/00 |
| 2018/0316760 | A1* | 11/2018 | Chernin | H04L 67/1097 |
| 2019/0266289 | A1* | 8/2019 | Bartholomew | G06F 16/9535 |

OTHER PUBLICATIONS

Ashwinkumar Badanidiyuru, et al., Bandits with knapsacks. In Foundations of Computer Science (FOCS), 2013 IEEE 54th Annual Symposium on. IEEE, 207-216, May 2013.

Charles La Clarke, et al., Novelty and diversity in information retrieval evaluation. In Proceedings of the 31st annual international ACM SIGIR conference on Research and development in information retrieval. ACM, 659-666, Jul. 20-24, 2008.

Choon Hui Teo, et al., Adaptive, personalized diversity for visual discovery. In Proceedings of the 10th ACM Conference on Recommender Systems. ACM, 35-38, Sep. 15-19, 2016.

Daniel N Hill, et al., An Efficient Bandit Algorithm for Realtime Multivariate Optimization. In Proceedings of the 23rd ACM SIGKDD International Conference on Knowledge Discovery and Data Mining. ACM, 1813-1821, Aug. 13-17, 2017.

Deepak Agarwal, et al., Spatiotemporal models for estimating click-through rate. In Proceedings of the 18th international conference on World wide web. ACM, 21-30, Apr. 20-24, 2009.

Deepak Agarwal, et al., 2015. Constrained optimization for homepage relevance. In Proceedings of the 24th International Conference on World WideWeb. ACM, 375-384, May 18-22, 2015.

Guorui Zhou, et al., Deep interest network for click-through rate prediction. In Proceedings of the 24th ACM SIGKDD International Conference on Knowledge Discovery & Data Mining. ACM, 1059-1068, Sep. 13, 2018.

Hao Yu, et al., Online Convex Optimization with Stochastic Constraints. In Advances in Neural Information Processing Systems. 1427-1437, Dec. 4-9, 2017.

Jaime Carbonell, et al., The use of MMR, diversity-based reranking for reordering documents and producing summaries. In Proceedings of the 21st annual international ACM SIGIR conference on Research and development in information retrieval. ACM, 335-336, Aug. 1998.

Jim C Huang, et al., Online Dual Decomposition for Performance and Delivery-Based Distributed Ad Allocation. In Proceedings of the 22nd ACM SIGKDD International Conference on Knowledge Discovery and Data Mining. ACM, 117-126, Aug. 13-17, 2016.

Kinjal Basu, et al., Large-Scale Quadratically Constrained Quadratic Program via Low-Discrepancy Sequences. In Advances in Neural Information Processing Systems. 2297-2307, Dec. 4-9, 2017.

Laming Chen, et al., Fast Greedy MAP Inference for Determinantal Point Process to Improve Recommendation Diversity. arXiv preprint arXiv:1709.05135, May 26, 2018.

Mehrdad Mahdavi, et al., Trading regret for efficiency: online convex optimization with long term constraints. Journal of Machine Learning Research 13, Sep. 2012, 2503-2528.

Neil Hurley et al., Novelty and diversity in top-n recommendation—analysis and evaluation. ACM Transactions on Internet Technology (TOIT) 10, 4 (2011), 14, Mar. 11, 2011.

Nikhil R Devanur, et al., A NewClass of Combinatorial Markets with Covering Constraints: Algorithms and Applications. In Proceedings of the Twenty-Ninth Annual ACM-SIAM Symposium on Discrete Algorithms. SIAM, 2311-2325, Nov. 27, 2015.

Nikhil R Devanur, et al., Whole-page optimization and submodular welfare maximization with online bidders. ACM Transactions on Economics and Computation (TEAC) 4, 3 (2016), 14, Mar. 2016.

Parikshit Shah, ea al., Online Ranking with Constraints: A Primal-Dual Algorithm and Applications to Web Traffic-Shaping. In Proceedings of the 23rd ACM SIGKDD International Conference on Knowledge Discovery and Data Mining. ACM, 405-414, Feb. 24, 2017.

Paul Covington, et al., Deep neural networks for youtube recommendations. In Proceedings of the $10^{th}$ ACM Conference on Recommender Systems. ACM, 191-198, Sep. 15-19, 2016.

Rodolphe Jenatton, et al., Adaptive Algorithms for Online Convex Optimization with Long-term Constraints. In International Conference on Machine Learning. 402-411, Dec. 23, 2015.

Rupesh Gupta, et al., Email volume optimization at LinkedIn. In Proceedings of the 22nd ACM SIGKDD International Conference on Knowledge Discovery and Data Mining. ACM, 97-106, Aug. 13-17, 2016.

Shipra Agrawal, et al., Linear contextual bandits with knapsacks. In Advances in Neural Information Processing Systems. 3450-3458, Dec. 5-10, 2016.

Thore Graepel, et al., Web-scale bayesian click-through rate prediction for sponsored search advertising in microsoft's bing search engine. In ICML 2011, Apr. 2009.

Wen Sun, et al., Safety-Aware Algorithms for Adversarial Contextual Bandit. In International Conference on Machine Learning. 3280-3288, Aug. 2017.

Xinran He, et al., Practical lessons from predicting clicks on ads at facebook. In Proceedings of the Eighth International Workshop on Data Mining for Online Advertising. ACM, 1-9, Aug. 24-27, 2014.

Ye Chen, et al., Query clustering based on bid landscape for sponsored search auction optimization. In Proceedings of the 19th ACM SIGKDD international conference on Knowledge discovery and data mining. ACM, 1150-1158, Aug. 11-14, 2013.

Yongfeng Zhang, et al., Economic recommendation with surplus maximization. In Proceedings of the 25th International Conference on World Wide Web. International World Wide Web Conferences Steering Committee, 73-83, Jun. 2016.

Yue Shi, et al, Adaptive diversification of recommendation results via latent factor portfolio. In Proceedings of the 35th international ACM SIGIR conference on Research and development in information retrieval. ACM,175-184, Aug. 12-16, 2012.

Yue Wang, et al., Beyond ranking: Optimizing whole page presentation. In Proceedings of the 9th ACM International Conference on Web Search and Data Mining. ACM, 103-112 Feb. 22-25, 2016.

* cited by examiner

106

| Top Box Office Movies | | | |
|---|---|---|---|
| Avatar | Titanic | Star Wars: The Force Awakens | Avengers: Infinity War |

| Movies for Purchase | | | |
|---|---|---|---|
| The Big Sick | Green Room | Arrival | Manchester by the Sea |

| Drama Movies | | | |
|---|---|---|---|
| Shindler's List | The Godfather | Casablanca | '96 |
| Citizen Kane | The Godfather Part II | Taxi Driver | The Shawshank Redemption |

*Fig. 1B*

OPTIMIZING CONTENT ENGAGEMENT WITH IMPOSED CONTENT CONSTRAINTS

BACKGROUND

Consumers of content are often presented with a seemingly never-ending selection of content that they can access through any number of different media outlets, software applications, or the like. Users are often enticed to explore a content page when that page is specifically tailored to the user's individual preferences. Assembling a content page for a particular user presents a unique optimization challenge when the entity assembling the content page would like to maximize user engagement while at the same time, expose the user to content that may meet other objectives of the entity. The task is further complicated by the risk of driving users away from using the entity's content services in the future due to user frustration with the content provided.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 1B is an illustrative user interface that provides content components to a user, according to one or more embodiments of this disclosure.

DETAILED DESCRIPTION

Figure 1A:
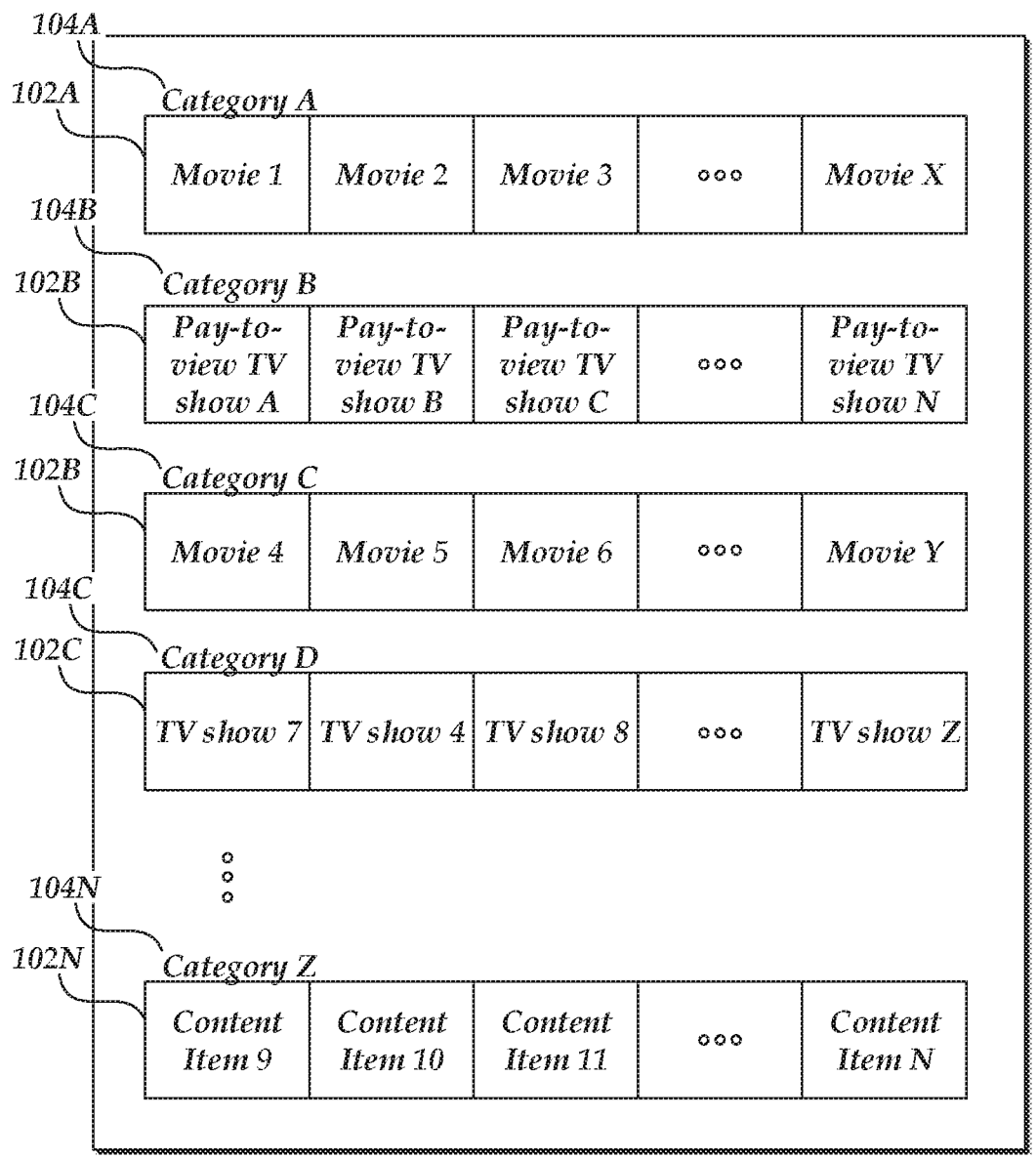
FIG. 1A is a visual representation of an illustrative sample of content components that may be used in generating a user interface, according to one or more embodiments of this disclosure.

The present disclosure generally relates to the use of computer learning methods for identifying content components that are likely to result in a desired user action when included in a portion of a content page. Specifically, the present disclosure relates to the use of artificial intelligence (AI) and machine learning methods to select content components to include in portions of a content page according to various global constraints and effectiveness standards imposed on the system assembling content pages. Organizing the content components may include considering the expected user engagement with each content component, both considered individually and in the context of other content components included in the page. The system assembling the content page may simultaneously endeavor to comply with certain global constraints imposed across multiple content page instances. The global constraints are imposed to the greatest extent possible before the expected user engagement with the page is adversely impacted to an unacceptable degree. The content constraints may be imposed on an entire set of content pages, such that only the content pages in the aggregate would be expected to comply with the constraint, as opposed to a local constraint specific to a single instance of a content page rendering. In this way, expected user engagement may be maximized without unduly constraining each content page, such that the global constraints may still be effectively imposed and reached by content pages in the aggregate.

A "content component" may be a content widget, a content row, a content column, a content table comprising multiple rows and/or columns, or a carousel file, where the content component comprises an arrangement of discrete content items. A discrete content item may include a discrete media item (e.g., song, movie, television show, etc.), a product item, user generated content item (e.g., social media post, blog entry, etc.), an advertisement, or a link thereto. Depending on context, as used herein, a content item may refer to an item itself or to information identifying the item. For example, a content item may refer to an actual song itself or may be an identifier associated with a song data file. Additionally, a content component may tend to include discrete content items from a single category of items, so as to avoid user confusion when browsing through content defined within the content component. While the present disclosure often uses the example of a content component as comprising a static set of content items, in some embodiments, a content component may consist of code modules that dynamically generate or arrange displayable and interactive content for inclusion in a content page. For example, a content component may be a code file configured to display a discrete set of content items. Similarly, a content component may be a code file configured to select content items for display. In some embodiments, a content component may comprise manually selected content items to include in a set. In other embodiments, a content component may be configured to programmatically select and/or arrange a set of discrete content items for inclusion in a content page. A content component may comprise a set of instructions, rules, or code that, when prompted, automatically selects a set of content items for including in the page. For example, based on a prompt to generate a carousel of romance novels, a particular content component may execute instructions causing it to assemble a carousel comprising a set of romance novels. In such embodiments, the assembly of such a set may be according to additional rules, or constraints, imposed on the system regarding which romance novels would be worthy of including in the set. A content component may be a code module or service capable of producing content which may be placed in a portion of a displayable file (e.g., in a particular row or section of a page). For example, a content component selected for inclusion in a portion of a displayable file, such as a page, may dynamically generate content that contains links, buttons or other controls for allowing users to perform specific actions, such as adding a displayed product or multimedia item to a shopping cart or a watch list.

A content page may include a home page, web page, dashboard, profile page, social media page, software application page, or other page configured to present a content component or an arrangement of content components for display on a user interface (UI). In some embodiments, a content page may provide discrete content items together with content components that consist of additional discrete content items. In yet another embodiment, a content page may consist of a code file specifying an arrangement of content components, discrete content items, or a combination of both, for display.

FIG. 1A provides a visual representation of content items included in (or generated by) each of multiple sample content components 102A-102N, any of which may be selected for inclusion in a content page for a user. In some embodiments, the content components 102A-102N may belong to discrete categories of content 104A-N. By including content items in categories, a user may be able to more easily navigate to a set of desired content and select a particular content item from within the category. In a non-limiting example, a category may include a specific type of content (e.g., genre, theme, etc.). For example, in the context of movies, a category may include dramas, documentaries, action films, short films, etc. In some instances, the categories may also be defined by purchasing options associated with the content items (subscription services, third party pay-to-view content, etc.). For example, category B may contain pay-to-view TV shows or movies that a user may need to purchase or rent before accessing, while category C may include movies from the drama category. Each category may have multiple different content components associated with the category and each content component may belong to multiple different categories. For example, Category A may define the same category as Category C. Additionally, each discrete content item may be designated for inclusion in more than one content component. For example, a particular movie may be part of both the top box office hits category and the drama category. Similarly, that same movie may then be part of different content components. Accordingly, there may be overlap between content items across different content components, such that multiple content components may comprise similar content items.

FIG. 1B illustrates a sample content page 106 including an example arrangement of content components. A user may browse through and interact with the content components and individual content items in any number of different ways that would readily be understood by a person skilled in the art (e.g., scrolling up and down, selecting an item, selecting a category, scrolling horizontally to access additional content items, etc.).

In selecting content components to incorporate into portions of a content page, it is generally desirable to present the most effective set of content components to the user. The effectiveness of presenting a content component or a set of content components can be a measure of whether a desired result is obtained from the user and/or whether a desired action is performed by the user. The desired action or result can be any action or result that may be desired from a user once the user has viewed content on the content page. For example, a desired action may be the user selecting a content item within the content component displayed, or the user eventually purchasing or renting an item displayed by a given content component. In some instances, the desired result is simply that the user has an opportunity to view a certain selection of content on the content page while browsing through content items. For example, it may be desirable that a user be presented with a content component containing content items for purchase within the first several content components so that the content component has a high probability of at least being viewed by the user as they browse through other content (such as freely available content items). In some instances, providing diverse content components on a content page may increase user engagement with the content page. A diverse set of content components refers to content components that are dissimilar from one another in terms of content items contained therein. In some embodiments, a diversity model may be implemented to ensure diversity of content components on a content page in an effort to increase user engagement. In other embodiments, a model may be implemented to ensure other effectiveness criteria are met, such as conversion rate or click-through-rate thresholds, which may, in turn, be a product of providing diverse content.

In yet another embodiment, a content page may include content that a user may access freely, whereas other content may require additional user information or additional user commitments before accessing. In such embodiments where a content page can also include content that a user can access without additional commitments (e.g., providing additional personal information, etc.), a user may prefer that the content page only include this accessible content while minimizing display of the content that requires additional commitments. Accordingly, it is desirable for a system tasked with composing a content page to assess the preferences of a particular user, history of a set of users, or other statistical data regarding the behavior of users, while at the same time imposing certain constraints that tend to guarantee that other objectives are met (such as exposing users to particular content for reasons other than maximizing user engagement or a particular user behavior).

In some instances, a constraint may relate to a requirement that the page composition system must consider when composing a content page. For example, a constraint may include a requirement to include a certain number of content components in assembling a content page or including a certain type of content component in the page. In some embodiments, a constraint may include a requirement for a predicted outcome or result based on the configuration of the content page. For example, a constraint may specify a desired number of occurrences that a specific content component or discrete content item is presented to a user through a content page (e.g., impression constraint). In other examples, a constraint may specify an expected conversion rate (CVR), an expected click-through-rate (CTR), an expected number of content component types to include on a single page, an expected number of different content categories to include on a single page, etc. In some embodiments, these constraints may be imposed on a single content page, such that the content page itself must satisfy or at least approximate the content constraint. In a non-limiting example, the constraint may specify an impression rate of one impression per week for a specific content component to be rendered for display on a user's content page(s), in which case the constraint would be fully satisfied if that specific content component is rendered on the user's content page(s) at least once during a given week.

In yet another embodiment, a global constraint may be imposed across multiple content pages for multiple users. In such embodiments, a global constraint may specify constraints for an aggregate number of content pages. A global constraint may be similar to those example constraints discussed above, but applied across multiple content pages for multiple users. For example, a global constraint may specify a metric to be applied across a set of content pages, such that the constraint is not measured against each content page individually or with respect to each user individually. In a non-limiting example, the global constraint may specify a metric for the average number of impressions that a particular content component should receive across multiple content pages displayed to different users. For example, the global constraint may require that a particular content component receive an average of one impression per content page, in which case the global constraint would be fully satisfied, as between two content pages, if the content component is impressed upon or displayed at least twice to one user on one content page, even if that content component is never displayed on a second content page, since the average would be one impression per content page for those two users. In some embodiments, one or more global constraints may be specific to particular users or user accounts. For example, a specific global constraint may specify a certain average number of impressions regarding a specific content component or type of content component for a single user or user account in a single timeframe. In a non-limiting example, the global constraint may require a content page to endeavor to display, on average, two subscription-type movie carousels to a specific user per 24-hour period. In other embodiments, a global constraint may be specific to all content pages for all users in which each instance or generation of a content page counts toward or against approximating the global constraint. In yet another embodiment, a global constraint may be set to apply only to a certain demographic of users or some other subset of users, in which some or all instances of a content page generated in associated with those users would apply toward or against approximating the global constraint. A person skilled in the art would understand that a global constraint may include a combined global constraint in which the constraint applies globally for a set of users and globally for a single user, in which the user may request multiple content pages over time, and thus, not all possible permutations of one or more global constraints will be described herein.

A database system may collect and store data based on these constraint details, user engagement details, etc., so as to track the effectiveness of a given set of content components and arrangement thereof on a content page and to track whether the content pages are satisfying one or more global constraints. This data may be utilized on a periodic basis (e.g., every 24 hours) or continuously to inform a page composition system regarding which page compositions are effective and whether new content components should be included to either increase their effectiveness or better approximate one or more of the global constraints.

As would be appreciated by one of skill in the art, the dynamic selection of content components to both maximize expected user engagement and increase the likelihood that an imposed constraint is met across many different content pages, generated independently of one another, as disclosed herein, represents a significant technological advance over prior implementations. Specifically, the disclosed techniques can identify content components for a set of content pages according to global constraints while maintaining expected user engagement for the content components of an individual content page. Further, the disclosed techniques provide a more flexible framework to learn the optimal composition of a content page than prior techniques interested in similar content page optimization. As such, the embodiments described herein represent significant improvements in this computer-related technology. For example, the composition of a content page in view of constraints imposed on other content pages while maintaining a certain degree of expected user engagement across each content page would be virtually impossible to replicate outside the realm of computer-related technology. In another example, the ability to impose convergence thresholds for assembling multiple content pages as an iterative process under the various constraints described herein using machine learning models represents a feat that could only be replicated within the realm of computer-related technology.

The various embodiments of interactive and dynamic user interfaces of the present disclosure are the result of significant research, development, improvement, iteration, and testing and in some embodiments, provide a particular manner of summarizing and presenting information in electronic devices. This non-trivial development has resulted in the user interfaces described herein which may provide significant efficiencies and advantages over previous systems. The interactive and dynamic user interfaces include improved human-computer interactions that may provide reduced mental workloads, improved decision-making, reduced work stress, and/or the like, for a user. For example, the user interfaces described herein may provide an optimized presentation of content components optimized for a particular user that may, regardless of the global constraints imposed, enable a user to quickly access, navigate, assess, and utilize such information than with previous systems which can be slow, complex and/or difficult to learn, particularly to novice users. For example, users would face the problem of having to search through hundreds of options for a show that they would like to watch and in some cases, would be faced with irrelevant content options or too many options that require the user to purchase or rent an item when that user has never purchased or rented an item before in the past. In addition, the selection of the content components would not be according to a global constraint imposed across a plurality of content pages. Presentation of relevant and compact information on a particular user interface makes for efficient use of the information available and optimal use of the content page while simultaneously guaranteeing that a global constraint is met.

Various aspects of the disclosure will now be described with regard to certain examples and embodiments, which are intended to illustrate but not limit the disclosure. Although the examples and embodiments described herein will include, for the purpose of illustration, specific calculations and algorithms, one of skill in the art will appreciate the examples are illustrative only, and are not intended to be limiting.

Network Computing Environment

Figure 2:
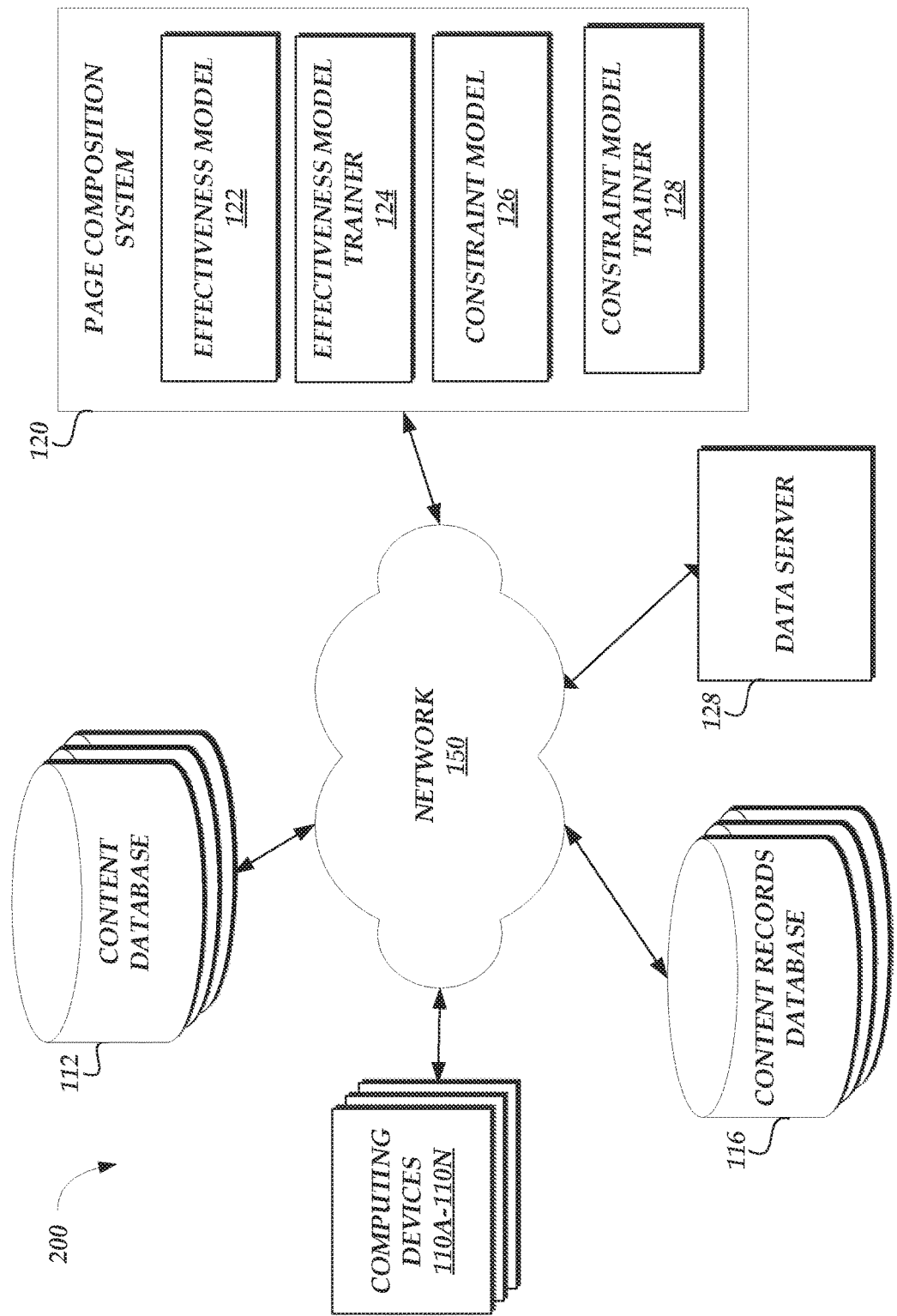
FIG. 2 is a block diagram of a page composition environment that includes one or more computing devices, information databases, one or more data servers, and a page composition system according to one embodiment.

FIG. 2 shows a computing environment 200 in which aspects of the present disclosure may be implemented. As shown, the computing environment may include user computing devices 110A-110N, a content database 112, a content records database 116, a page composition system 120, and one or more data servers 128. The user computing devices 110, content database 112, content records database 112, item information database 116, page composition system 120, and data servers 128 may communicate with each other via one or more communication networks 150. A communication network 150 may be a publicly accessible network of linked networks, possibly operated by various distinct parties, such as the Internet. In other embodiments, the network 150 may include a private network, personal area network, local area network, wide area network, cable network, satellite network, cellular telephone network, peer-to-peer network, etc. or a combination thereof, some or all of which may or may not have access to and/or from the Internet.

The user computing devices 110A-110N may each be any device capable of network access, such as a phone, laptop, desktop computer, tablet, etc. In addition, user computing devices 110 may have the ability to provide a user interface or graphical user interface to a user, for example, via a touch enabled display. Each user computing device 110 may be associated with a dedicated user or group of users interested in interacting with the page composition system 120, such as a consumer of content or multiple consumers using a shared profile. In cases where multiple users may be accessing a shared profile or account, the use of that profile may be considered as belonging to a single user unless the system allows an individual user to identify oneself as that user provides input to the system. In some embodiments, the page composition system 120 may prefer more or less granularity for sources of data input (e.g., individual users versus shared accounts) depending on the configuration of the system.

The content database 112 may include a potentially large number of available content items (e.g., movies, songs, commercial products, etc.). In some embodiments, individual content items may be digital content items that can be accessed directly via a user interface or downloaded to a user device for consumption by a user, while in other embodiments, individual content items may represent physical items (e.g., physical products that a user may order for physical shipment to a mailing address). The content database 112 may also include content components, which may each include a defined set or combination of discrete content items or may include code, instructions or rules for dynamically selecting a set of discrete content items. In some embodiments, one or more separate content databases 112 may include the actual content file for each discrete content item, whereas another content database may include a pointer or identifier for each content file or content component. For example, each possible content component may be assigned a reference indicator that references, in a database, additional indicators that each represent individual content files. A person skilled in the art would understand the numerous ways in which content can be stored, referenced, accessed and retrieved from one or more databases.

The content records database 116 may include information regarding each content file and/or each content component. For example, the content records database 116 may include information regarding statistics or history for user engagement with content on various content pages that have been presented to users. The content records database 116 may also include contextual information for the user engagement statistics. For example, the content records database 116 may include information regarding statistical data for a single content component along with information regarding other content components presented in connection with that content component. The statistical or historical data may include data related to the effectiveness of a content page composition, including the effectiveness of sets of content components in specific combinations or presentation order, as well as individual content components. In some embodiments, the effectiveness data may be stored with respect to each user or group of users. This data may be uploaded from a user device to the database system or to a data analytics engine (not shown) that conditions the data before storing it in the content records database 116. In some embodiments, the historical and/or statistical data may be uploaded to and/or updated in content records database 116 continuously, periodically (e.g., every 24 hours), or as a hybrid of both. For example, the data may be uploaded on a continual basis to a temporary storage unit or content records database 116, but only analyzed every 24 hours so as to send a condensed chunk of statistical data to content records database 116. In a non-limiting example, a user device may track which content components are displayed to a user, how many times each content component is shown, whether a user selects a content item within a content component, whether a user is engaging with the content page more or less than usual, and other metrics for tracking user engagement. The content records database 116 may also store data related to a user's learned preferences from past behavior or preferences that a user has provided to the system.

Additionally, the content records database 116 may store data on the effectiveness of an arrangement of content components in driving user engagement. For example, content records database 116 may store historical impression rates, CVR, or CTR data for each set of content components presented across all content pages. This data may be determined based on an aggregation of data and may be analyzed by a data server 128 or a page composition system 120.

Data server 128 may be implemented to facilitate the flow of information from various databases, systems, models, trainers, and devices. Data server may be implemented as part of page composition system 120 or may be a separate server device with authorization to access and manipulate the various different database items, models and trainers within page composition system 120. For example, data server 104 may be responsible for employing or maintaining the machine learning techniques described herein.

The page composition system 120 may include various components for providing the features described herein. Illustratively, the page composition system 120 may include an effectiveness score model 122 for generating scores regarding effectiveness of content components or a predicted effectiveness of a set of content components using machine learning techniques, an effectiveness model trainer 124 for training the effectiveness score model 122, a constraint model 126 for generating and optimizing constraint values that are used in generating a content page, and constraint model trainer 128 for training the constraint model 126. The components of the computing environment 200 including the components of the page composition system 120 are illustrative only, and are not intended to be limiting. In some embodiments, fewer, additional, and/or alternative components may be implemented by the computing environment 200 or the page composition system 120.

As used herein, a "database" refers to any data structure (and/or combinations of multiple data structures) for storing and/or organizing data, including, but not limited to, relational databases (e.g., Oracle databases, MySQL databases, etc.), non-relational databases (e.g., NoSQL databases, key-value databases, etc.), in-memory databases, object-based database, dictionary, spreadsheets, as comma separated values ("CSV") files, eXtendible markup language ("XML") files, TeXT ("TXT") files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

In addition, the models of page composition system 120 may be machine learning (ML) models or comprise executable instructions for implementing deep learning algorithms. For brevity, these aspects may not be described with respect to each possible ML model that may be used. In practice, many or all of the aspects of the disclosure may apply to one or more ML models, including but not limited to those described herein. Examples of ML models that may be used with aspects of this disclosure include classifiers and non-classification ML models, whole-page models, a support vector machine ("SVM"), artificial neural networks ("NNs"), linear regression models, logistic regression models, decision trees, Naïve or a non-Naïve Bayes network, k-nearest neighbors ("KNN") models, k-means models, clustering models, random forest models, or any combination thereof. For example, effectiveness model 122 may be a whole-page model. As an illustrative example, effectiveness model trainer 124 may deploy one or more Bayesian linear network models, random forest models, and SVMs to train a whole-page model to generate engagement predictions, effectiveness scores, diversity scores, etc., in accordance with one or more embodiments of this disclosure. In some embodiments, a ML model may be trained on a dataset using a supervised learning method (e.g., gradient descent, projected gradient descent, stochastic gradient descent, etc.) depending on the particular application. For example, certain aspects of the disclosure will be described using events or behaviors (e.g., conversion rates, impressions, scoring, etc.) with respect to content components, content pages, products, services, objects, etc. for purposes of illustration only.

The page composition system 120 and/or data server 128 may be implemented on one or more physical server computing devices that provide computing services and resources. In some embodiments, the page composition system 120, data server 128, or individual components thereof may be implemented on one or more host devices, such as blade servers, midrange computing devices, mainframe computers, desktop computers, or any other computing device configured to provide computing services and resources. For example, a single host device may execute one or more instances of a page composition system 120 (or individual components thereof). A computing environment 200, such as a network computing provider, may include any number of such hosts.

In some embodiments, the features and services provided by the page composition system 120 and/or data server 128 may be implemented as web services consumable via the communication network 150. In further embodiments, the page composition system 100, data server 128, or individual components thereof are provided by one more virtual machines implemented in a hosted computing environment. The hosted computing environment may include one or more rapidly provisioned and released computing resources, such as computing devices, networking devices, and/or storage devices. A hosted computing environment may also be referred to as a cloud computing environment.

In some embodiments, page composition system 120 may include an effectiveness model 122. The effectiveness model 122 may comprise a model configured to generate an effectiveness score for one or more content components based on data records stored in content records database 116. An effectiveness score may represent the effectiveness that a set of content components has relative to another set of content components in effectuating a desired result or outcome. In other embodiments, an effectiveness score may be assigned to each individual content component to represent the effectiveness each content component may have in the context of a content page. An effectiveness score may also take into account a diversity score for the content components of a content page. A diversity score may signify how diverse a set of content components are with respect to each other irrespective of other criteria. For example, a set of content components of the same category or type may receive a lower diversity score than a set of content components from different categories or having different types. In some embodiments, the effectiveness score may be based primarily, or in some instances, solely, on diversity of a set of content components. In some embodiments, an effectiveness score may be assigned to a particular content component. In such embodiments, the effectiveness score may be based on a positioning of the particular content component relative to a set of other content components. For example, determining the effectiveness score for a content component may be informed based on other content components positioned in proximity to the particular content component on a content page (e.g., within a certain number of content components of the particular component, the content components that appear before the particular content component, etc.). In such embodiments, the effectiveness score for a content component may be based on the context in which the content component appears on a page, since a single content component may be more effective in affecting user engagement in some instances and less effective in others. In addition, a single content component may be assigned an effectiveness score dynamically based on the context in which a content page is requested or launched. For example, a single content component may be more effective and thus, receive a higher effectiveness score, when presented at a certain time of the day to a particular user, whereas it may be less effective when presented at a different time of the day to the same user. In a non-limiting example, past user data for a particular user may demonstrate that a carousel containing kids films may be more effective if presented before 7 pm, whereas a carousel containing adult action films for the same user may be more effective if more prevalently presented after 9 pm (e.g., positioned higher on a content page).

In other embodiments, an effectiveness score may be assigned to a set of content components. Additionally, the effectiveness score for a set of content components may be based on or in view of additional content components included in the set that were not present in the set previously. For example, in a situation where individual content components are being assembled for display to a user, and where a first two content components are already allocated for display, candidates for a potential third slot may receive an effectiveness score in the context of the other allocated components. In a non-limiting example, content components A, B, and C may have a higher effectiveness score over content components A, B, and D where the combination of A, B, and C resulted in or are expected to result in a higher user engagement over the combination of A, B, and D for a particular user. In addition, content components C and D may also receive individual effectiveness scores for the page, in addition to the proposed set of content components receiving an effectiveness score in the context of the particular proposed arrangement. Furthermore, an effectiveness model trainer 124 may be configured to train the effectiveness model 122 based on feedback or input retrieved from a content records database 116. In some embodiments, the effectiveness model 122 may be a ML model configured to generate predictions regarding effectiveness based on training data from content records database 116. In a non-limiting example, the ML effectiveness model 122 may predict an estimated conversion rate for a set of content components particularly arranged on a content page based on data collected over a particular timeframe (e.g., an hour, a day, a week, a year, etc.).

In some embodiments, page composition system 120 may include a constraint model 126. The constraint model 126 may be configured to generate a constraint value that may be utilized in composing a content page. A constraint value may be a value that approximates a given global constraint (e.g., average number of impressions for a particular content component across a set of content pages, average number of conversions for a particular content component across a set of content pages, etc.). The global constraints may be input to page composition system 120 as parameters identifying a requirement or set of requirements that a plurality of content pages should satisfy, or at least should tend to approximate, when those content pages are viewed in the aggregate. In some embodiments, a single constraint value may represent a single global constraint, whereas in other embodiments, a single constraint value may represent multiple constraints.

The constraint value may be a value that is initially generated from data stored in content records database 116 and may be generated in view of the particular global constraints. For example, the constraint value may be generated from historical data, such as data retrieved from content records database 116. In some embodiments, the historical data selected for training constraint model 126 may be specific to data stored over a predetermined period of time (e.g., one hour, one day, one week, etc.). Alternatively, an initial constraint value may be selected with a default value, such as an initial value of zero or some other a non-negative value. In such embodiments, the value may gradually be adjusted based on historical data for the content pages and content components.

The constraint value may represent the likelihood that a content page will result in a global constraint being met or violated/missed when considering other content pages subject to the same global constraint. In some embodiments, the constraint value may signify the cost of imposing certain global constraints in generating a content page in terms of predicted effectiveness for that page. In an illustrative visual example, the constraint value may signify the distance between a target and a predicted or actual point of impact. The constraint value may indicate that the page composition may need to be adjusted in order to ensure the global constraints are satisfied. In some embodiments, the initial constraint value for a particular constraint may comprise a dual-variable received as an output from a ML model pre-trained on past user data (e.g., historical page data from the day before, etc.).

Constraint model 126 may adjust the constraint value when composing a new content page by comparing the difference between the previously rendered content pages tendency to approximate a global constraint target. In some embodiments, a target may be associated with the global constraint. For example, constraint model 126 may generate a representation of the global constraint in terms of a tangible or measurable target. An actual approximation value may be associated with a content page's ability to approximate the target. For example, if the global constraint requires that an average of two specific content component types be shown per page within the first five rows, and the first ten pages previously generated only have an average of one for the specific content component types in the first five rows, then the actual approximation value for those content pages will be low with a great distance from the target. The difference between the actual approximation value and the target may be considered when adjusting the global constraint value between generating subsequent content pages. In other embodiments, the global constraint value may be adjusted in-between selecting content components for an individual content page in addition to, or alternatively to, being adjusted between content pages as they are generated as a whole. For example, content components may be selected in succession for a content page where after each content component is selected for the page, the constraint value is adjusted based on the previous content pages and the selected content components slated for the current page.

An adjusted global constraint value may be applied in the generation of a subsequent content page, such that the subsequent content page, pursuant to the adjusted global constraint, may have a better chance of approximating the global constraint target while maintaining an acceptable effectiveness of the content page with respect to the expected user engagement with the content page. In some embodiments, a convergence threshold may be implemented where the page composition algorithm and the constraint values can converge after the model explores and learns from previous iterations.

The constraint model 126 may be configured to adjust the constraint value after using the constraint value to update content on a content page. In some instances, the constraint model 126 may be configured to adjust the constraint value during the content component allocation and selection phase or during the rendering of a current content page. In some embodiments, a constraint value may be adjusted using a primal-dual approach. For example, a constraint value may be updated using projected gradient descent. Furthermore, a constraint model trainer 126 may be configured to train the constraint model 128 based on feedback or input retrieved from a content records database 116. In other examples, a first-order (e.g., gradient) approach may be used to adjust the constraint value in accordance with certain embodiments discussed herein. Accordingly, constraint model 126 may adjust the constraint value based on a determination as to how each global constraint is either met or missed with a given content page, as well as based on outputs from the effectiveness model 122. In yet another embodiment, the gradient update may be derived based on the actual form of effectiveness model 122, constraint model 126, and the error in the global constraint being met versus missed.

In some embodiments, the constraint model 126 and the effectiveness model 122 may be employed in tandem to generate a content page. For example, the constraint model 126 and the effectiveness model 122 may engage in an iterative process to generate a content page that comprises a set of content components. The iterative process is configured to maximize predicted user engagement with the content page based on effectiveness scores for the content components and maximize the likelihood of reaching the global constraint with respect to the content page associated with the user and other content pages associated with other users. In some embodiments, the iterative process will continue until a convergence threshold is satisfied where an optimal content page has been configured. In some embodiments, once the convergence threshold is satisfied, user interface data is generated for the optimal content page and transmitted to a user device for displaying the content page on the user device. In other embodiments, user interface data is generated as each content component is selected as a result of an iterative process of selecting content components and readjusting the constraint value to better approximate the global constraint or values for multiple global constraints.

In some embodiments, the constraint value may be adjusted between each content page generation. In other embodiments, the constraint value may be adjusted after a certain number of page generations or after a certain amount of time. In a non-limiting example, constraint model 126 may determine an initial constraint value for each global constraint or a single constraint value representing multiple global constraints. The initial constraint value may be used to compose content pages for a first hour of home page traffic. The content pages and their traffic for that hour may then be evaluated against the constraint target, to estimate the error in approximating the target during that time period. Page composition system 120 may then back-propagate the error to update the constraint values. This may be done in an iterative process, which may converge at a convergence threshold after a certain number of page generations and constraint value adjustments. In other embodiments, page composition system 120 may collect a current pool of content pages from a previous time period, apply the iteration pattern from the previous time period to the current pool of content pages in an offline simulation in an effort to predict at what value a given constraint value may converge. This prediction may be used in generating constraint values based on global constraints in future iterations of content page generations. For example, instead of initializing the constraint value at a value of zero to start and adjusting the value from there, the value may be set based on the prediction obtained from the offline simulation.

Figure 3:
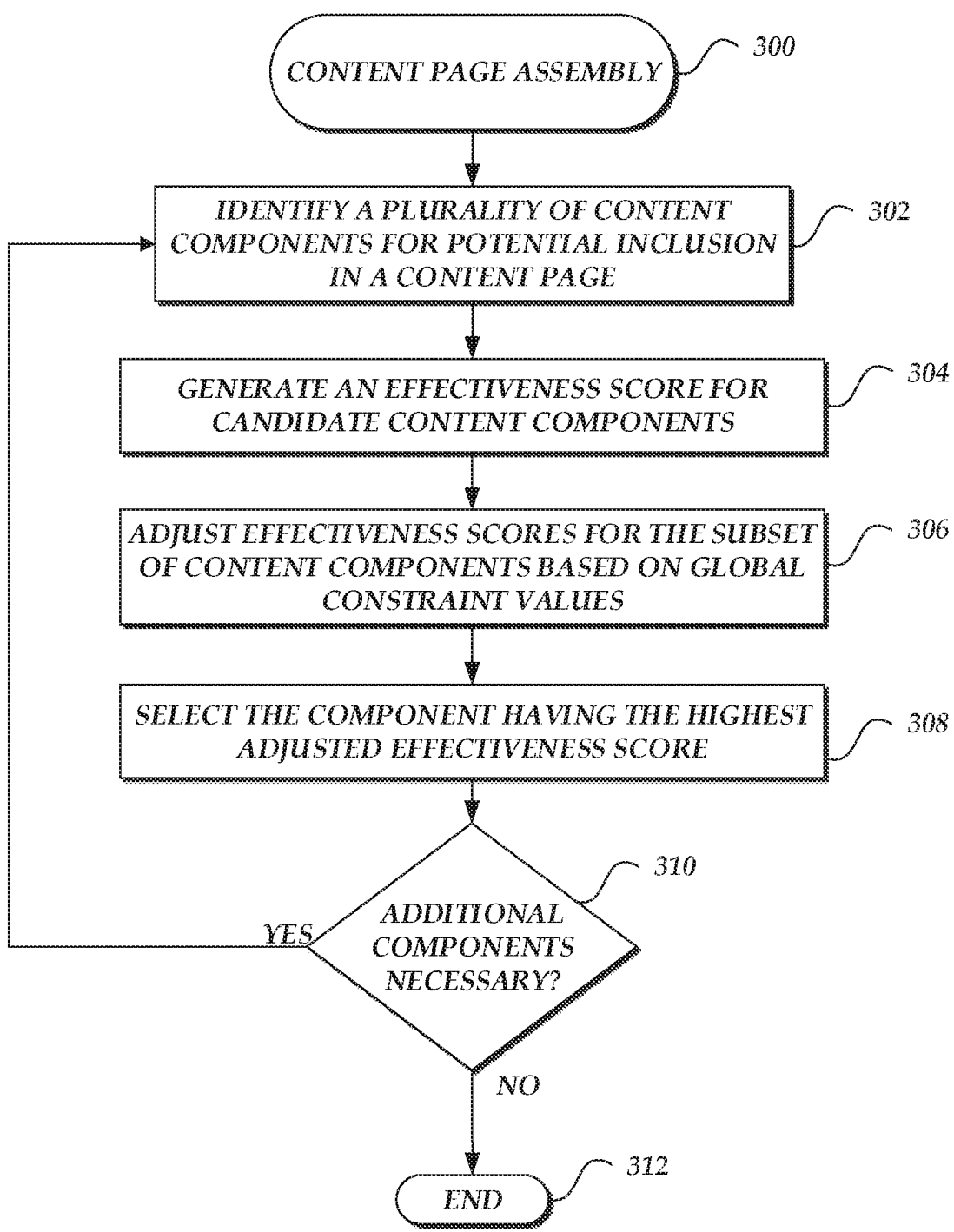
FIG. 3 is a flow diagram illustrative of a content page assembly routine for composing a content page according to some embodiments.

FIG. 3 is a flow diagram illustrating an example routine for content page assembly 300 that may be executed by page composition system 120. The process 500 will be described in connection with example content components, content items making up the content components, and content pages comprising content components. However, the examples are for illustration only, and are not intended to be limiting. In some embodiments, the process 300 or portions thereof may be used in connection with different calculations or deploy different ML models and/or utilize different training parameters for training the ML models.

The process 300 shown in FIG. 3 begins at block 302. The process 300 may begin in response to an event, such as when a user device requests a content page, or, for example, when a user initiates a software application hosting the content page. When the process 300 is initiated, a set of executable program instructions stored on one or more non-transitory computer-readable media (e.g., hard drive, flash memory, removable media, etc.) may be loaded into memory (e.g., random access memory or "RAM") of a computing device of the page composition system 120. The executable instructions may then be executed by a hardware-based computer processor (e.g., a central processing unit or "CPU") of the computing device. In some embodiments, the process 300 or portions thereof may be implemented on multiple processors, serially or in parallel.

At block 302, page composition system 120 may identify a plurality of content components for potential inclusion in a content page. Page composition system 120 may identify the content components from a corpus of content components available in content database 112. Identifying the candidate set of content components may be based on maximizing expected user engagement while taking into account diversity among content components. In some embodiments, page composition system 120 may determine that a default content component, such as one regarding recently watched movies or recently purchased items, should be selected for a first row or position of the content page. Page composition system 120 may then determine which content components should follow the first content component for displaying in other rows or positions on the content page. In other embodiments, the set may include all possible content components for potential inclusion in the content page without providing a default content component.

At block 304, page composition system 120 may generate or retrieve an effectiveness score for a set of candidate content components. In some embodiments, the set of candidate content components may include all possible content components available for inclusion in a current portion of a page. In other embodiments, a reduced selection of content components may be used as the set of candidate content components. The page composition system 120 may generate the effectiveness scores relative to a current portion of the content page to be populated. For example, the current portion of the content page to be populated may be a particular row that is being populated with a potential content component. As illustrated, the illustrative method 300 may loop through multiple passes of block 304. In some embodiments, the initial pass through block 304 may be to populate the first row or first portion of the page with a content component, while the next pass may be to populate the second row or second portion with another content component.

The page composition system 120 may score the set of content components using the effectiveness model 122 or retrieve effectiveness scores stored in content records database 116 or another database. For example, the effectiveness model 122 may generate an effectiveness score for each individual content component in the set. The effectiveness model 122 may additionally, or alternatively, generate an effectiveness score for each possible combination of identified content components or each individual content component in view of other content components that have been previously selected for another portion of the page. The effectiveness score may be indicative as to how effective the one or more content components would be in increasing the expected user engagement. This determination may be based on whether the content is relevant to the particular user based on past user data.

At block 306, page composition system 120 may adjust the effectiveness scores for the subset of content components or for each individual content component based on global constraint values. For example, the effectiveness scores may be increased or decreased based on an application of the global constraint values in order to approximate one or more of the global constraints. In some embodiments, a constraint value may be applied to the effectiveness score for a single candidate content component. In other embodiments, the constraint value may be applied to adjust the effectiveness score of a set of content components taken together. The process for adjusting the effectiveness score will be described with reference to FIG. 4.

At block 308, page composition system 120 may select the content component having the highest adjusted effectiveness score for inclusion in the current portion of the content page. In some embodiments, page composition system 120 may rank individual content components based at least in part on the content component having the highest adjusted effectiveness score for the current portion of the page to be populated. In other embodiments, page composition system 120 may rank individual content components taken from the set of content components having the highest adjusted effectiveness scores. The highest ranked content component may then be selected for inclusion in the current portion of the content page to be populated.

At block 310, page composition system 120 may determine whether additional components are necessary for including in the content page, or otherwise should be included. This decision may be based on one or more global constraints, one or more local constraints (e.g., a page template for the particular page), or other factors. For example, page composition system 120 may determine whether the global constraints are likely to be satisfied based on the current page composition, previously composed content pages whose content counts toward the global constraint, and the likelihood that other content pages will be generated that would help satisfy the global constraint. In some instances, page composition system 120 may determine that including a new content component may be necessary in order to help satisfy the global constraint. This decision may be based on a determination that including a content component specifically configured to approximate the global constraint may possibly be included in the content page. In a non-limiting example, such a determination may be based on a finding that the currently allocated content components have a high effectiveness score that would be only slightly impacted, if at all, by inclusion of a content component specifically configured to approximate the global constraint. An ML model may generate a determination as to whether the global constraints will likely be satisfied by the content page based at least in part on the constraint value. Additionally, page composition system 120 may determine whether any additional components are necessary to approximate a local constraint (e.g., that a specific number of content components appear on a page). If page composition system 120 determines that the global constraints will likely be satisfied, then the remainder of the content page may be composed without imposing any global constraints on the page and may focus on, for example, maximizing user engagement or satisfying other constraints or complying with other factors in assembly the remainder of the page.

If page composition system 120 determines that an additional content component is necessary for including in the page, then the process proceeds to block 302, where the process may repeat to include a next content component in the content page. If page composition system 120 determines that an additional content component need not be included for the particular content page, then the process ends at block 312. The page composition system 120 may determine this based on local constraints imposed for the page, such as the maximum number of content components that can be included in a content page or for a relevant portion of a content page, where other portions may be dynamically generated as a user accesses other portions of the page (e.g., when scrolling). This process may repeat in a finite loop until a full set of content components are allocated for the content page and the balance between achieving the global constraints with the content page and the expected user engagement has been optimized to the fullest extent possible. User interface data may be generated based on the assembled content page for displaying the content page on the requesting user device, either in parallel with the process or once the process ends and all content components are selected for the particular content page.

Figure 4:
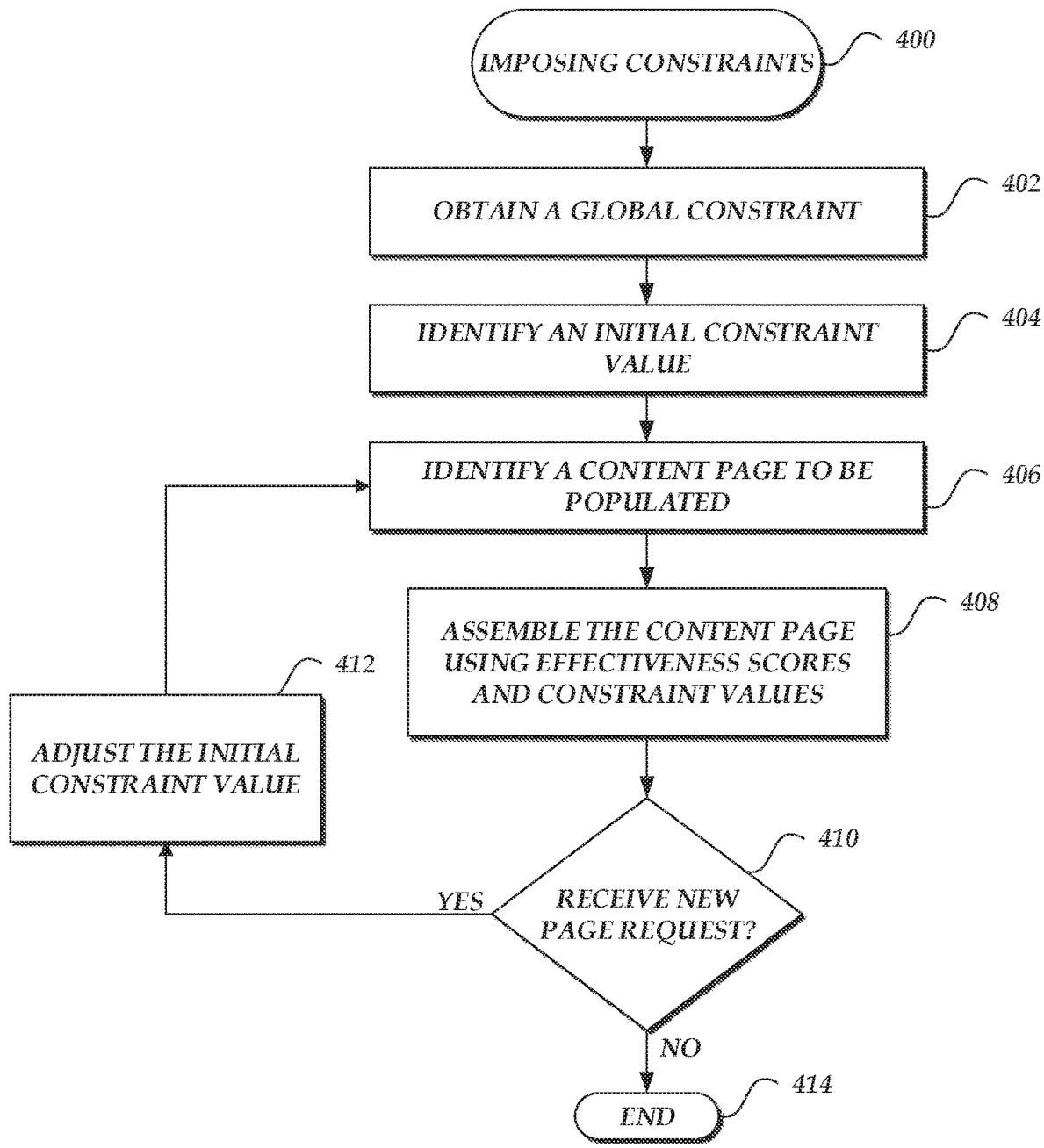
FIG. 4 is a flow diagram illustrative of a routine for imposing a constraint for one or more content pages according to some embodiments.
Figure 5:
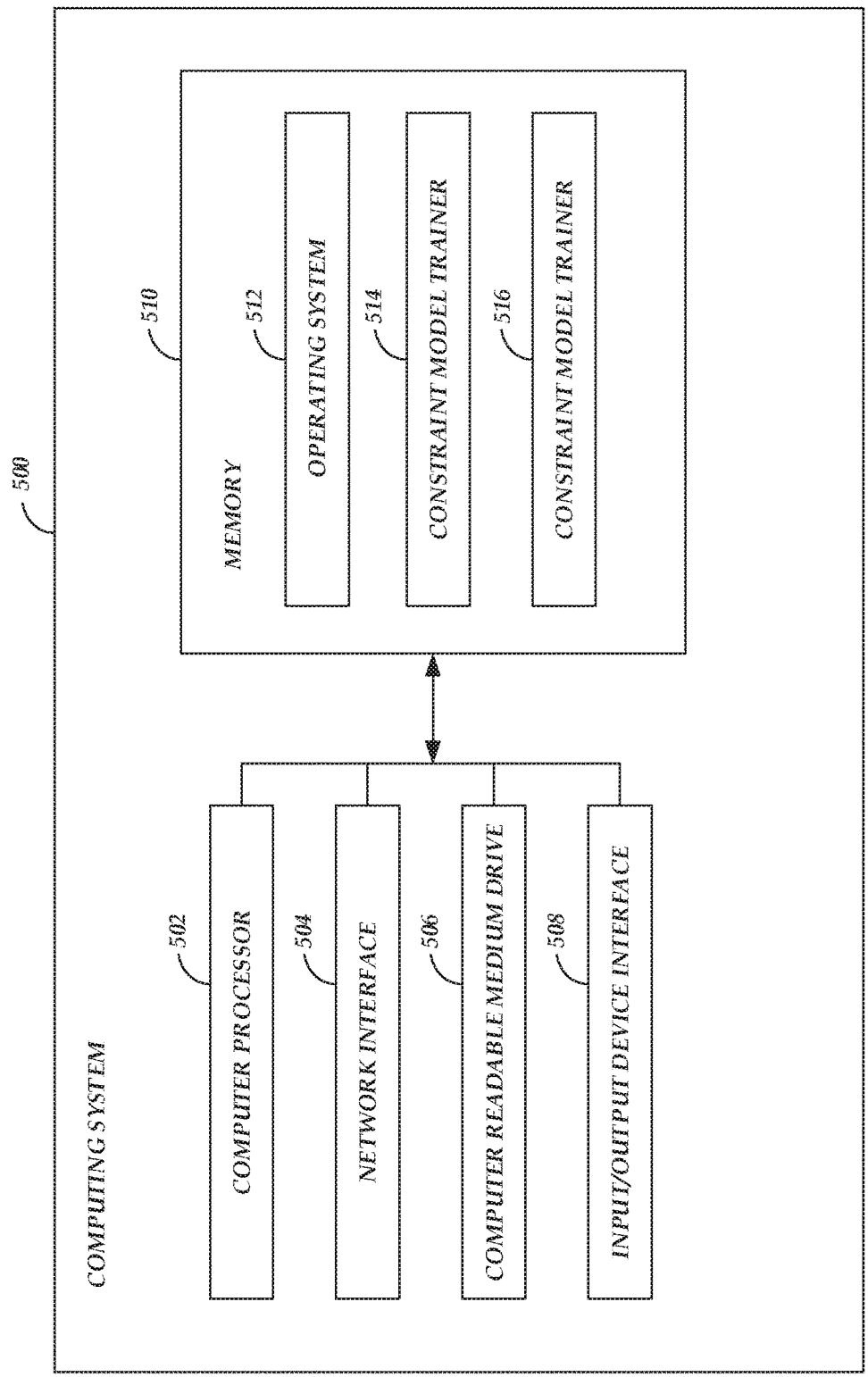
FIG. 5 is a block diagram of an illustrative computing system configured to implement page composition features according to some embodiments.

FIG. 4 is a flow diagram illustrating an example routine for imposing constraints 400 that may be executed by page composition system 120. The process 400 will be described in connection with example content components, content items making up the content components, and content pages comprising content components. However, the examples are for illustration only, and are not intended to be limiting. In some embodiments, the process 400 or portions thereof may be used in connection with different calculations or deploy different ML models and/or utilize different training parameters for training the ML models.

The process 400 shown in FIG. 4 begins at block 402. The process 400 may begin in response to an event, such as when global constraints are inputted to the system or previously generated by page composition system 120. The process may proceed through blocks 402 and 404 where the process may then wait for a next event to occur, such as the initiation of content page assembly routine 300, before proceeding through blocks 406, 408 and 410 as part of block 306 of content page assembly routine 300. When the process 400 is initiated, a set of executable program instructions stored on one or more non-transitory computer-readable media (e.g., hard drive, flash memory, removable media, etc.) may be loaded into memory (e.g., random access memory or "RAM") of a computing device of the page composition system 120. The executable instructions may then be executed by a hardware-based computer processor (e.g., a central processing unit or "CPU") of the computing device. In some embodiments, the process 300 or portions thereof may be implemented on multiple processors, serially or in parallel.

At block 402, page composition system 120 may obtain a global constraint. A global constraint may be obtained from the content records database 116 or some other database. In some embodiments, a global constraint may be provided as an input directly to page composition system 120. A global constraint may take on the ultimate form of a rule set or an instruction that places a requirement on a group of content pages to include certain content across the group. For example, an administrator may specify that a certain content component or certain type of content component (e.g., a content component requiring additional information or commitments from a user) must receive an average number of impressions or conversions across a set of content pages. The administrator may manually input or upload a file to page composition system 120 or to a database accessible to the system.

At block 404, an initial constraint value may be identified for the global constraint. Constraint model 126 may deploy an ML model trained on data retrieved from content records database 116 as an input in order to output the initial constraint value. The model may be trained on past conversion rates, impression rates, click-through-rates, etc. In some embodiments, multiple constraint values may be identified for each discrete global constraint. Accordingly, constraint model 126 may generate an initial constraint value based on this historical data or the constraint value may be initiated using a default value, where the initial constraint value may be optimized in an iterative process.

At block 406, page composition system 120 may identify a content page to be populated or that is in the initial stages of being generated. For example, a user device may launch an application requiring a content page to be generated. Accordingly, page composition system 120 may receive a request to generate a content page for a user.

At block 408, page composition system 120 may assemble the content page using effectiveness scores and constraint values, in accordance with embodiments described herein. In some embodiments, page composition system 120 may assemble the content page using the process described with respect to FIG. 3. For example, page composition system 120 may evaluate the content components selected for the content page using the constraint value. The global constraint value may be used to determine to what extent the selected content components approximate the global constraint based on a prediction regarding the composition of other content pages with content components selected under the same global constraints and expected user engagement with respect to those pages. An ML model may be deployed to provide such a determination and/or prediction based on past user data and/or constraint values. Page composition system 120 may adjust the effectiveness scores for the content components based at least in part on this evaluation. Applying the constraint value may in some instances, increase the effectiveness score for the content components and may decrease the effectiveness score for others. For example, an effectiveness score may be determined irrespective of the constraint value for each of a plurality of content components. The effectiveness score may then be adjusted based on the constraint value in an effort to better approximate or reach the global constraint target while maintaining effectiveness of the content components on the page. In such embodiments, a higher adjusted score represents a more favorable content component for including in the content page in view of the other candidate content components that are also scored and evaluated.

In some embodiments, page composition system 120 may include a specific content component in the content page together with the previously selected content components. Page composition system 120 may determine that the addition of a specific content component to the content page in order to increase the likelihood that the global constraint is met is worth the risk of sacrificing effectiveness (e.g., expected user engagement). In some embodiments, the adjustment may be based on an ML model trained on past user data and/or the constraint values to predict the tradeoff between losing effectiveness for content components on a content page and missing a global constraint.

At block 410, page composition system 120 may receive a request to generate a subsequent content page. For example, a user may launch an application, thereby prompting the system to generate a content page for the user. In other instances, the page composition system 120 may generate content pages offline before receiving the request from a user launching an application. For example, page composition system 120 may receive a request to generate a batch of content pages for multiple users in anticipation of the user requesting the page at a later time. Accordingly, the one or more content pages may be generated in an offline process based on a batch request regardless of whether a user actually desires the content page at that time.

At block 412, page composition system 120 may adjust the global constraint value for applying to the assembly of the new content page. For instance, the global constraint value may be an initial global constraint value or a constraint value adjusted in a previous iteration. In some embodiments, this step may be optional and the process may proceed directly to block 406 using an unadjusted constraint value. This process may repeat in a loop until no other page requests are received. Accordingly, the process may end at block 414 when no other content pages are being assembled. The process may start back up again once a new page request comes in or when the system determines independently that content pages should be rendered (e.g., in an offline process).

In various implementations, the described blocks of the flowchart of FIGS. 3 and 4 may be performed in an order other than that specifically disclosed, or multiple blocks may be combined in a single block. The example blocks may be performed in serial, in parallel, or in some other manner. Further, blocks may be added to or removed from the disclosed example embodiments.

A person skilled in the art would understand that one or more ML models may perform the processes of routines 300, 400, and 500 in tandem. For example, a first ML model may be trained to determine subsequent candidate content components, whereas another ML model may be trained to approximate the constraint value for the content pages. In some instances, the ML models may exchange information in an iterative process in order to arrive at a desired result. In other instances, a single ML model may be responsible for carrying out the functions of determining content components for a content page whilst taking into account the global content constraints for the plurality of content pages.

Execution Environment

FIG. 6 illustrates an example computing system 500 configured to execute the processes and implement the features described above in connection with, e.g., the page composition system 120 and/or the data server 128. In some embodiments, the computing system 500 may include: one or more computer processors 602, such as physical CPUs; one or more network interfaces 504, such as a network interface cards ("NICs"); one or more computer readable medium drives 506, such as high density disk drives ("HDDs"), solid state drives ("SDDs"), flash drives, and/or other persistent non-transitory computer-readable media; an input/output device interface 508, such as an IO interface in communication with one or more external storage drives; and one or more computer readable memories 510, such as RAM and/or other volatile non-transitory computer-readable media.

The network interface 504 can provide connectivity to one or more networks or computing systems, such as a data server 128. The computer processor 502 can receive information and instructions from other computing systems or services via the network interface 504. The network interface 504 can also store data directly to the computer-readable memory 510. The computer processor 502 can communicate to and from the computer-readable memory 510, execute instructions and process data in the computer readable memory 510, etc.

The computer readable memory 510 may include computer program instructions that the computer processor 502 executes in order to implement one or more embodiments. The computer readable memory 510 can store an operating system 512 that provides computer program instructions for use by the computer processor 502 in the general administration and operation of the computing system 500. The computer readable memory 510 can further include computer program instructions and other information for implementing aspects of the present disclosure. For example, in one embodiment, the computer-readable memory 510 may include a constraint model trainer 514 that, e.g., implements the constraint imposing operations and other operations of one or more of processes 300 and 400.

In some embodiments, multiple computing systems may communicate with each other via their respective network interfaces 504 via network 150, and can implement constraint value and effectiveness-related features independently (e.g., each computing system 500 may execute one or more separate instances of the processes 300, 400, etc.), in parallel (e.g., each model 122, 126 or data server 128 may execute a portion of a single instance of one or more of processes 300, 400, etc.), etc. For example, a distributed computing environment may provide hosted capabilities for implementing the systems and methods described herein.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, read-only ("ROM") memory, erasable programmable read-only ("EPROM") memory, electrically erasable programmable read-only ("EEPROM") memory, registers, hard disk, a removable disk, a compact disk read-only memory ("CD-ROM"), or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an application-specific integrated circuit ("ASIC"). In some instances, the ASIC can reside in a computing device, such as a mobile device operated by a requesting customer or an asset. In the alternative, the processor device and the storage medium can reside as discrete components in a computing device.

As described herein, various embodiments may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled or non-touch enabled displays).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system for selecting content components for inclusion in a plurality of content pages, the system comprising:
a non-transitory storage medium that stores information regarding a constraint value for use in evaluating whether inclusion of a particular content component in a content page is consistent with a global constraint, wherein the global constraint is imposed across the plurality of content pages presented to one or more users over a time period, wherein the global constraint represents a target of an average number of times, across the plurality of content pages presented over the time period, that one or more particular content components should be included per instance of a presented content page; and a physical computing device in communication with the non-transitory storage medium and that is configured to:

receive a request to compose a first content page;

identify a first content component for inclusion in the first content page, wherein the first content component is configured to select a first plurality of items for display;

identify a second content component to include with the first content component in a proposed first set of content components, wherein the second content component is configured to select a second plurality of items for display;

identify a third content component to include with the first content component in a proposed second set of content components, wherein the third content component is configured to select a third plurality of items for display;

determine a first effectiveness score for the second content component, wherein the first effectiveness score represents an expected effectiveness of including the second content component with the first content component in effectuating a desired user action;

determine a second effectiveness score for the third content component, wherein the second effectiveness score represents an expected effectiveness of including the third content component with the first content component in effectuating the desired user action;

adjust the first and second effectiveness scores based on the constraint value to determine an adjusted first effectiveness score and adjusted second effectiveness score;

generate, based at least in part on the adjusted first effectiveness score and the adjusted second effectiveness score, a ranking for the proposed first and second sets of content components; and designate, based at least in part on the ranking for the proposed first and second sets of content components, the first set of content components for populating respective portions of the first content page, such that (a) a first portion of the first content page includes the first plurality of items selected for display by the first content component and (b) a second portion of the first content page includes the second plurality of items selected for display by the second content component.

2. The system of claim 1, wherein the first effectiveness score is higher than the second effectiveness score.

3. The system of claim 1, wherein the physical computing device is further configured to:

receive a request to compose a second content page;

adjust the constraint value based at least in part on the global constraint and the content components included in the first content page in order to set an adjusted constraint value to be used in generating the second content page; and identify, based at least in part on the adjusted constraint value, a set of content components for inclusion in the second content page.

4. The system of claim 1, wherein the global constraint is based at least in part on at least one of: an impression constraint or a conversion constraint.

5. A computer-implemented method comprising:

determining a first effectiveness score for a first content component that is configured to select a first plurality of items for display;

determining a second effectiveness score for a second content component that is configured to select a second plurality of items for display;

providing, as input to a machine learning (ML) model, information associated with the first and second content component, the ML model trained to assign rankings to content components to be used in generating a first content page based at least in part on (a) a global constraint value applied across a plurality of content pages and (b) the first and second effectiveness scores, wherein the global constraint value is used to adjust an effectiveness score for each particular content component identified in the input to the ML model based on an extent to which inclusion of the particular content component in a content page is consistent with a global constraint, wherein the global constraint is imposed across the plurality of content pages presented to one or more users over a time period, wherein the global constraint represents a target of an average number of times, across the plurality of content pages presented over the time period, that one or more particular content components should be included per instance of a presented content page;

assigning, using the ML model, a first ranking to the first content component based at least in part on the global constraint value and the first effectiveness score;

assigning, using the ML model, a second ranking to the second content component based at least in part on the global constraint value and the second effectiveness score;

determining that the first content component has a higher ranking than the second content component; and designating the first content component for populating a portion of the first content page with the first plurality of items.

6. The computer-implemented method of claim 5, wherein the constraint value is based at least in part on historical data regarding one or more content components.

7. The computer-implemented method of claim 5, wherein the first content component is configured to select a discrete set of content items from a first category of content items, and wherein the second content component is configured to select content items from a second category of content items.

8. The computer-implemented method of claim 5, wherein the first content component comprises instructions that configure a computing device to dynamically select a plurality of content items for display based at least in part on an item category or item type of the plurality of content items.

9. The computer-implemented method of claim 5, wherein one of the first and second content components supports the global constraint.

10. The computer-implemented method of claim 9, wherein assigning the rankings to the content components further comprises:

utilizing a prediction for expected user engagement with the one or more content components that support the global constraint.

11. The computer-implemented method of claim 5, wherein the first effectiveness score represents at least one of: a diversity score as between at least two content components and an expected user engagement score.

12. The computer-implemented method of claim 5, further comprising:
receiving a request to compose a second content page;
adjusting the constraint value based at least in part on the content components designated for populating the first content page; and
identifying a set of content components for populating the second content page based at least in part on the adjusted constraint value.

13. The computer-implemented method of claim 5, wherein the ranking of a particular set of content components indicates a balance between a relative likelihood that the global constraint will be supported and the effectiveness of the particular set of content components.

14. A non-transitory computer-readable medium storing computer-executable instructions that, when executed by one or more computing devices, configure the one or more computing devices to perform operations comprising:
generating user interface data for a content page comprising one or more content components, wherein the content components are selected from a plurality of content components, wherein each content component of the plurality of content components is configured to select a different set of items for display, and wherein selecting the one or more content components comprises:
determining an effectiveness score for each content component identified for potential inclusion in the content page, wherein the effectiveness score for an individual content component represents an expected effectiveness in effectuating a desired user action by including the individual content component in the content page;
adjusting the effectiveness score for each content component based at least in part on a global constraint value, wherein the global constraint value is based at least in part on a global constraint imposed across a plurality of content pages presented to one or more users over a time period, wherein the global constraint represents a target of an average number of times, across the plurality of content pages presented over the time period, that one or more particular content components should be included per instance of a presented content page; and
selecting at least one content component to use in generating the user interface data based at least in part on the adjusted effectiveness score for each content component.

15. The non-transitory computer-readable medium of claim 14, wherein each effectiveness score is based at least in part on past user behavior with respect to interacting with content components in a previous instance.

16. The non-transitory computer-readable medium of claim 14, wherein a machine learning (ML) model is used to generate the effectiveness score for each content component.

17. The non-transitory computer-readable medium of claim 16, wherein the computer-executable instructions further configure the one or more computing devices to train the ML model using historical data regarding the content components.

18. The non-transitory computer-readable medium of claim 14, wherein the global constraint specifies a requirement for a type of content component to approximate an average metric across a plurality of content pages.

19. The non-transitory computer-readable medium of claim 16, wherein selecting each content component for the content page is based at least in part on data associated with content components that have been previously selected for the content page using the ML model.

20. The non-transitory computer-readable medium of claim 14, wherein the effectiveness score is adjusted based at least in part on one or more other content components previously selected to use in generating the user interface data.

* * * * *